(12) United States Patent
Hockaday

(10) Patent No.: US 10,180,365 B2
(45) Date of Patent: Jan. 15, 2019

(54) NON-INTRUSIVE STRESS MEASUREMENT SYSTEM UN-LENSED PROBE SEATING LOCKING DEVICE

(71) Applicant: UNITED TECHNOLOGIES CORPORATION, Hartford, CT (US)

(72) Inventor: Bruce Hockaday, Vernon, CT (US)

(73) Assignee: United Technologies Corporation, Hartford, CT (US)

(*) Notice: Subject to any disclaimer, the term of this patent is extended or adjusted under 35 U.S.C. 154(b) by 352 days.

(21) Appl. No.: 15/003,180

(22) Filed: Jan. 21, 2016

(65) Prior Publication Data

US 2017/0212010 A1  Jul. 27, 2017

(51) Int. Cl.
*G01L 1/24* (2006.01)
*G01D 11/24* (2006.01)

(52) U.S. Cl.
CPC .............. *G01L 1/24* (2013.01); *G01D 11/245* (2013.01)

(58) Field of Classification Search
CPC ................................. G01L 1/24; G01D 11/245
USPC ........................................................ 73/866.5
See application file for complete search history.

(56) References Cited

U.S. PATENT DOCUMENTS

| | | | | |
|---|---|---|---|---|
| 4,848,199 A * | 7/1989 | Kelm | ...................... | B23B 27/00 407/112 |
| 5,325,734 A * | 7/1994 | Jordan | ...................... | G01P 1/00 324/207.25 |
| 5,662,418 A * | 9/1997 | Deak | ...................... | G01K 13/02 374/144 |
| 5,669,263 A * | 9/1997 | Borchers | .............. | G01D 11/245 73/304 C |
| 5,792,059 A * | 8/1998 | Furia | ........................ | A61B 8/42 600/459 |
| 6,227,703 B1 * | 5/2001 | DiMatteo | .............. | G01D 11/245 374/208 |
| 6,923,082 B1 * | 8/2005 | Smith | ................... | G01D 11/245 73/866.5 |
| 7,326,917 B2 * | 2/2008 | Diatzikis | ................ | G01H 9/004 250/227.14 |
| 7,896,002 B2 * | 3/2011 | Watanabe | .......... | A61M 15/0065 128/200.14 |
| 8,256,297 B2 * | 9/2012 | Sue | ......................... | G01H 1/006 73/643 |
| 9,181,818 B2 * | 11/2015 | Warren | ................... | G01D 5/353 |
| 2005/0204534 A1 * | 9/2005 | Bellis | ................... | G01D 11/245 29/428 |
| 2008/0202235 A1 * | 8/2008 | Laps | ..................... | G01D 11/245 73/431 |

(Continued)

*Primary Examiner* — Lisa Caputo
*Assistant Examiner* — Nathaniel T Woodward
(74) *Attorney, Agent, or Firm* — Snell & Wilmer L.L.P.

(57) ABSTRACT

In various embodiments, the present disclosure provides a probe seating and locking device comprising a main body and a sleeve disposed at least partially concentrically about a probe. In various embodiments, the main body comprises a relief cut, a probe channel in communication with the relief cut, and a probe housing extending from the main body, wherein the probe housing has a probe passage in communication with the probe channel. In various embodiments, the probe passage comprises a first end, a second end, and a sensing aperture, wherein the probe housing is coupled to the main body at the first end. In various embodiments, the probe is disposed in the probe channel and is in contact with the seating step.

20 Claims, 6 Drawing Sheets

(56) References Cited

U.S. PATENT DOCUMENTS

| | | | | |
|---|---|---|---|---|
| 2012/0067130 A1* | 3/2012 | Kaiser | ............... | B60T 8/368 |
| | | | | 73/706 |
| 2012/0118086 A1* | 5/2012 | Horn | ............... | G01D 11/245 |
| | | | | 73/866.5 |
| 2013/0321002 A1* | 12/2013 | Elliott | ............ | G01D 11/245 |
| | | | | 324/662 |
| 2016/0084073 A1* | 3/2016 | Shanks | ............ | E21B 47/06 |
| | | | | 73/152.52 |

* cited by examiner

NON-INTRUSIVE STRESS MEASUREMENT SYSTEM UN-LENSED PROBE SEATING LOCKING DEVICE

FIELD

The present disclosure relates to a Non-intrusive Stress Measurement System (NSMS), and more particularly, to NSMS probe holders for turbomachinery and gas turbine engines and methods for ensuring proper seating of NSMS probes in the probe holder.

BACKGROUND

A gas turbine engine typically includes a fan section, a compressor section, a combustor section and a turbine section. The fan section and compressor section together are typically referred to as the cold section. The combustor section and turbine section together are typically referred to as the hot section. Bladed disk turbomachinery of the cold section and the turbine section rotate at great speed which places the blades under severe stress. For operational analysis and safety it is desirable to monitor these stresses. Non-Intrusive Stress Measurement System (NSMS) are systems which monitor these stresses without relying on sensors integral to or intruding on the rotating turbomachinery. NSMS sensors mounted external to the blade disk are used to measure each blade's behavior including vibratory response characteristics such as stress, phase, frequency, resonance, and damping.

Un-lensed fiber optic probes may receive reliable signals when held in close proximity to the blade. Typical standoff distances are less than 10 mm from the blade, thus probe holders are used to keep the probe in proximity to the blade at the correct standoff. The current NSMS un-lensed probe holders have a probe housing with a seating step and a viewing aperture. The optical fibers may be sheathed by a thin walled hypo tube which provides protection from mechanical damage and a pathway for coolant to flow around the fibers.

During assembly, the probe is unsecured after insertion into the probe holder and may back away from the seating step during a welding operation, thus fixing the probe at an improper standoff distance. In addition, spot welding the strap directly to the thin wall hypo tube may compromise the hypo tube's ability to contain the coolant flow. Weld current, at times, may be lowered to insure hypo tube integrity but may also compromise the weld penetration.

SUMMARY OF THE DISCLOSURE

In various embodiments, the present disclosure provides a probe seating and locking device comprising a main body and a sleeve disposed at least partially concentrically about a probe. In various embodiments, the main body comprises a relief cut, a probe channel in communication with the relief cut, and a probe housing extending from the main body, wherein the probe housing has a probe passage in communication with the probe channel. In various embodiments, the probe passage comprises a first end, a second end, and a sensing aperture, wherein the probe housing is coupled to the main body at the first end. In various embodiments, the probe is disposed in the probe channel and is in contact with the seating step.

In various embodiments, the sleeve is disposed within the relief cut. In various embodiments, the sleeve is coupled to the probe by at least one of brazing or welding. In various embodiments, the relief cut has a first index surface and the sleeve has a second index surface. In various embodiments, the first index surface and the second index surface are configured to align a sensing end of the probe proximate the sensing aperture. In various embodiments, the probe passage further comprises a seating step wherein an interference between the first index surface and the second index surface is configured to hold the probe in contact with the seating step at the second end of the probe housing. In various embodiments, the probe housing comprises at least one of steel, stainless steel, aluminum, aluminum alloy, titanium, or titanium alloy.

In various embodiments, the present disclosure provides a probe seating and locking device comprising a main body and a sleeve disposed at least partially concentrically about a probe. In various embodiments, the main body comprises a relief cut, a probe channel in communication with the relief cut, and a probe housing extending from the main body, wherein the probe housing has a probe passage in communication with the probe channel. In various embodiments, the probe passage comprises a first end, a second end, and a sensing aperture, wherein the probe housing is coupled to the main body at the first end, wherein the probe housing is disposed at an angle to the main body. In various embodiments, the probe is disposed in the probe channel and is in contact with the seating step.

In various embodiments, the sleeve is disposed within the relief cut. In various embodiments, the sleeve is coupled to the probe by at least one of brazing or welding. In various embodiments, the relief cut has a first index surface and the sleeve has a second index surface. In various embodiments, the first index surface and the second index surface are configured to align a sensing end of the probe proximate the sensing aperture. In various embodiments, the probe passage further comprises a seating step wherein an interference between the first index surface and the second index surface is configured to hold the probe in contact with the seating step at the second end of the probe housing. In various embodiments, the probe housing comprises at least one of steel, stainless steel, aluminum, aluminum alloy, titanium, or titanium alloy. In various embodiments, the probe housing is coupled to the main body by one of brazing or welding.

In various embodiments, the present disclosure provides a method of seating and locking a probe in a probe holder comprising forming a relief cut across a probe channel of a probe holder having a main body, coupling a sleeve about a probe having a sensing end, and inserting the probe into the probe holder and the sleeve into the relief cut such that the sleeve lies in the relief cut with the sensing end of the probe proximate a sensing aperture of a probe passage. In various embodiments, the method further comprises defining a first index surface of the relief cut, and defining a second index surface of the sleeve. In various embodiments, the method further comprises calculating a first distance along the relief cut, the probe channel, and the probe passage between the first index surface of the relief cut and the sensing aperture, and calculating a second distance along the probe between the second index surface of the sleeve and the sensing end of the probe. In various embodiments, the method further comprises brazing the sleeve to the probe at a point where the first distance and the second distance are equal, and inserting the sleeve in the relief cut such that the first index surface lies proximate the second index surface. In various embodiments, the method further comprises coupling a metallic tack strap across the relief cut and over the sleeve, and welding the metallic tack strap to the main body.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

All ranges and ratio limits disclosed herein may be combined. It is to be understood that unless specifically stated otherwise, references to "a," "an," and/or "the" may include one or more than one and that reference to an item in the singular may also include the item in the plural.

In various embodiments, a probe holder having a main body and a probe housing is provided. The probe holder may comprise various features configured to properly seat a probe, such as a thin wall hypo tube. Moreover, a sleeve may be disposed concentric to or otherwise about the thin wall hypo tube. The sleeve may mechanically interact with the probe holder to properly seat the thin wall hypo tube with respect to the probe holder. In addition, the sleeve may act as a welding surface for the welding of a tack strap. The tack strap may be welded to the probe holder and the sleeve, thereby coupling the thin wall hypo tube to the probe holder. In that regard, the sleeve tends to protect the thin wall hypo tube from damage that may occur during the welding process.

Figure 1A:
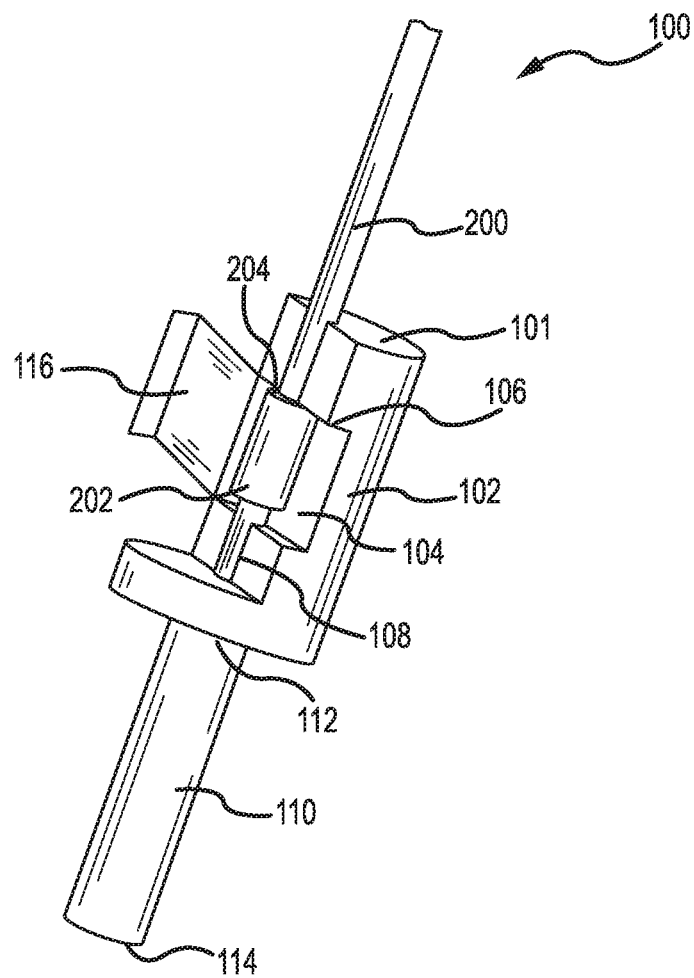
FIG. 1A illustrates a probe seating and locking device having a straight probe holder, in accordance with various embodiments.

With reference now to FIG. 1A, a probe seating and locking device 100 comprises a main body 102, a probe channel 108 a relief cut 104 which runs across the main body 102 perpendicular to probe channel 108. A probe housing 110 having a first end 112 and a second end 114 opposite the first end 112 is coupled to main body 102 proximate the first end 112. A probe 200 coupled to a sleeve 202 is disposed within probe housing 110 and is disposed with respect to main body 102 such that the sleeve 202 lies in the relief cut 104. First index surface 106 of relief cut 104 is proximate a second index surface 204 of sleeve 202. A metallic strap such as a tack strap 116 is coupled to the main body 102.

In various embodiments, the probe holder may comprise at least one of steel, stainless steel, aluminum, an aluminum alloy, titanium, a titanium alloy, and/or other suitable materials. In various embodiments, the probe housing 110 is coupled to the main body 102 by brazing or welding. In various embodiments, probe housing 110 and main body 102 may be integrally formed as a single part. In various embodiments, the probe 200 is a thin wall hypo tube.

In various embodiments, probe 200 has a sensing end. In various embodiments, probe 200 comprises a thin wall hypo tube that may comprise at least one of metal, aluminum, steel or stainless steel. In various embodiments, the thin wall hypo tube may have a wall thickness of between about 0.180 inches (0.457 cm) to about 0.0005 inches (0.00127 cm), between about 0.160 inches (0.406 cm) to about 0.005 inches (0.0127 cm), and between about 0.150 inches (0.381 cm) to about 0.05 inches (0.127 cm), wherein the term about in this context only refers to +/−0.0001 inches (0.000254 cm). In various embodiments, the thin wall hypo tube may have a wall thickness of about 0.100 inches to about 0.001 inches. In various embodiments, a thin wall hypo tube, such as probe 200, may have a wall thickness of about 0.040 inches to about 0.0012 inches. In various embodiments, a sleeve, such as sleeve 202, may comprise at least one of steel, stainless steel, aluminum, an aluminum alloy, titanium, a titanium alloy, and/or other suitable materials. In various embodiments the sleeve is coupled to the probe about the thin wall hypo tube, for example, concentrically or at least partially concentrically. In various embodiments, an interference between the first index surface and the second index surface prevents the sensing end from backing away from the sensing aperture. In various embodiments, a metallic strap is coupled over the sleeve to the main body.

Figure 1B:
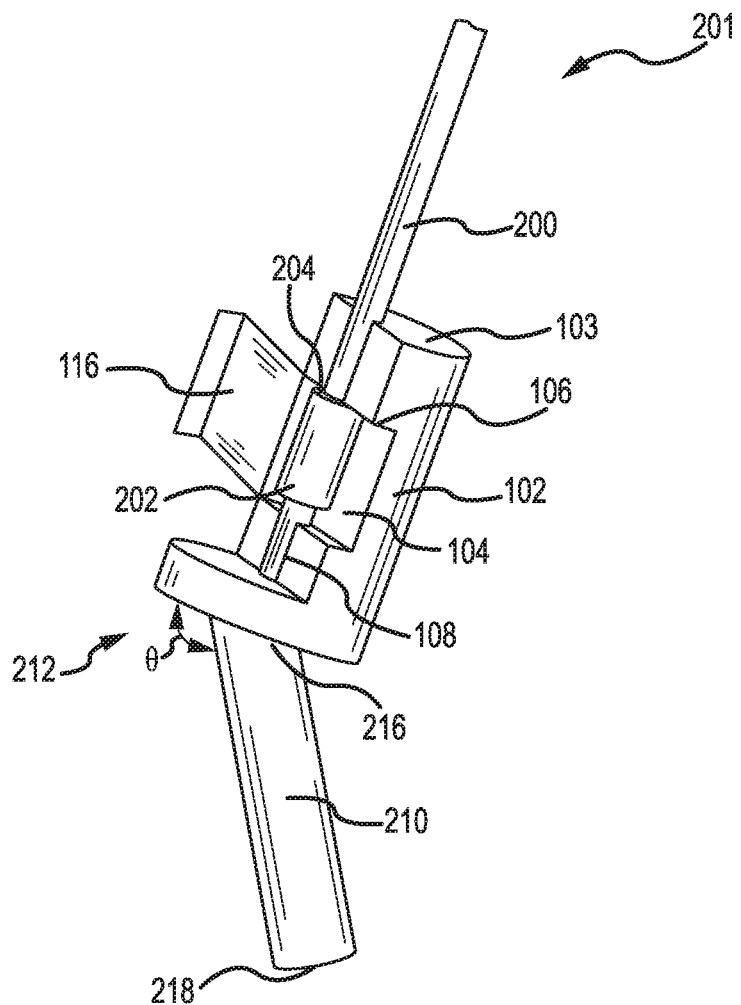
FIG. 1B illustrates a probe seating and locking device having a curved probe holder, in accordance with various embodiments.

With reference now to FIG. 1B, a probe seating and locking device 201 may comprise many shared features with probe seating and locking device 100, except that probe seating and locking device 201 comprises curved probe housing 210 having a first end 216 and a second end 218 opposite the first end 216 is coupled to main body 102 proximate the first end 216. A probe 200 coupled to a sleeve 202 is disposed within curved probe housing 210 and is disposed with respect to main body 102 such that the sleeve 202 lies in the relief cut 104. Curved probe housing 210 comprises angle 212, denoted as angle φ, between curved probe housing 210 and main body 102, wherein angle 212 is generated.

Figure 2:
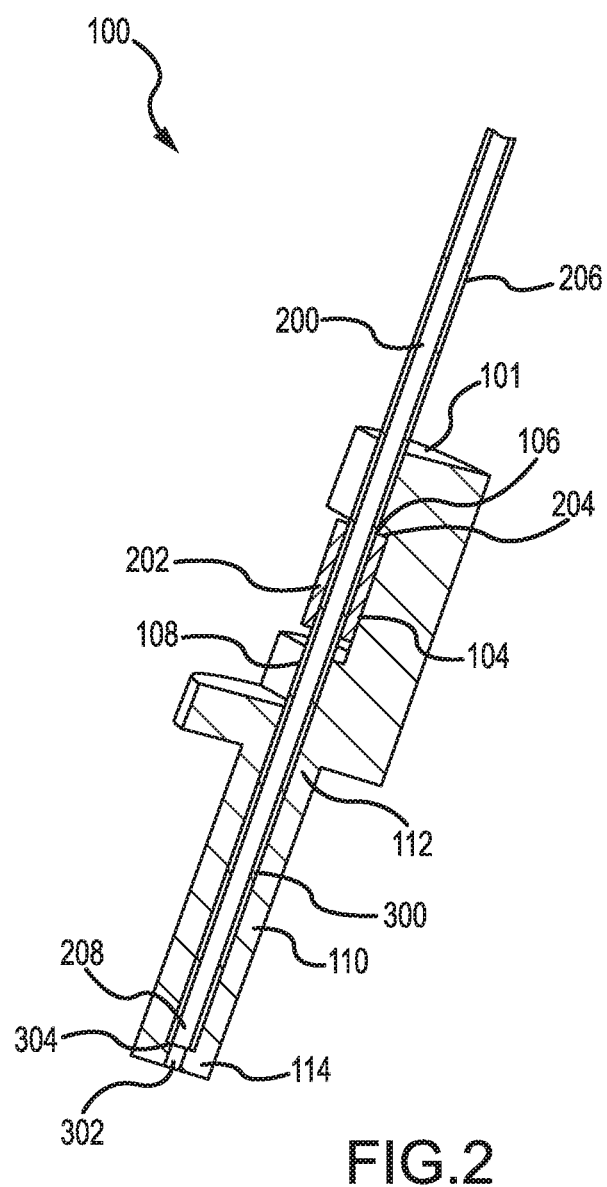
FIG. 2 illustrates a sectional view of a probe seating and locking device, with the tack strap omitted to provide clarity of the detailed features, in accordance with various embodiments.

In various embodiments and with reference now to FIG. 2, probe 200 comprises a thin wall hypo tube and has a sensing end 208. Sleeve 202 is coupled about the probe 200 by, for example, brazing or shrink fit. Probe 200 is inserted into the probe channel 108 of the straight probe holder 101 and through a probe passage 300 running from the first end 112 to the second end 114 of the probe housing 110. Probe passage 300 is terminated at the second end 114 by seating sensing aperture 302 upon seating step 304. With sleeve 202 lying in relief cut 104, probe 200 is held in contact with seating step 304 by an interference between the first index surface 106 and the second index surface 204, which places sensing end 208 of probe 200 proximate sensing aperture 302 and tends to prevent the sensing end 208 from translating within the probe passage 300 away from sensing aperture 302 toward the first end 112.

Figure 5:
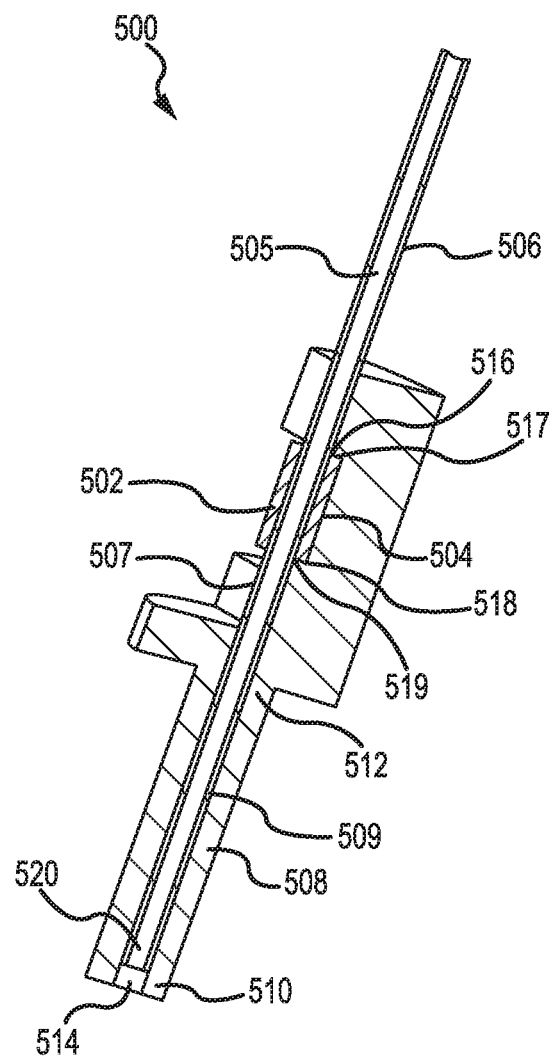
FIG. 5 illustrates a sectional view of a probe seating and locking device, with the tack strap omitted to provide clarity of the detailed features, in accordance with various embodiments.

In various embodiments and with reference now to FIG. 5, probe seating and locking device 500 may comprise many shared features with probe seating and locking device 100 or probe seating and locking device 201. Probe seating and locking device 500 comprises probe 506, relief cut 504, and probe housing 508, which lacks a seating step such as seating step 304, shown in FIG. 2. Probe 505 has sensing end 520 and may, in various embodiments, comprise a thin wall hypo tube. Probe 505 is inserted into probe channel 507 and through probe passage 509 running from the first end 512 to the second end 510 of probe housing 508. Probe passage 509 terminates at second end 510 with sensing aperture 514. Sleeve 502 is coupled about the probe 505 by, for example, brazing or shrink fit. With sleeve 502 lying in relief cut 504, sensing end 520 of probe 505 is held proximate sensing aperture 514 by an interference between first index surface 516 and second index surface 517 and by an interference between third index surface 518 and fourth index surface 519. Interference between the first index surface 516 and the second index surface tends to prevent the sensing end 520 of probe 505 from translating within the probe passage 509 away from sensing aperture 514 and toward first end 512. Interference between the third index surface 518 and the fourth index surface 519 tends to prevent the sensing end 520 of probe 505 from translating within the probe passage 509 toward sensing aperture 514 and toward second end 510.

Figure 3:
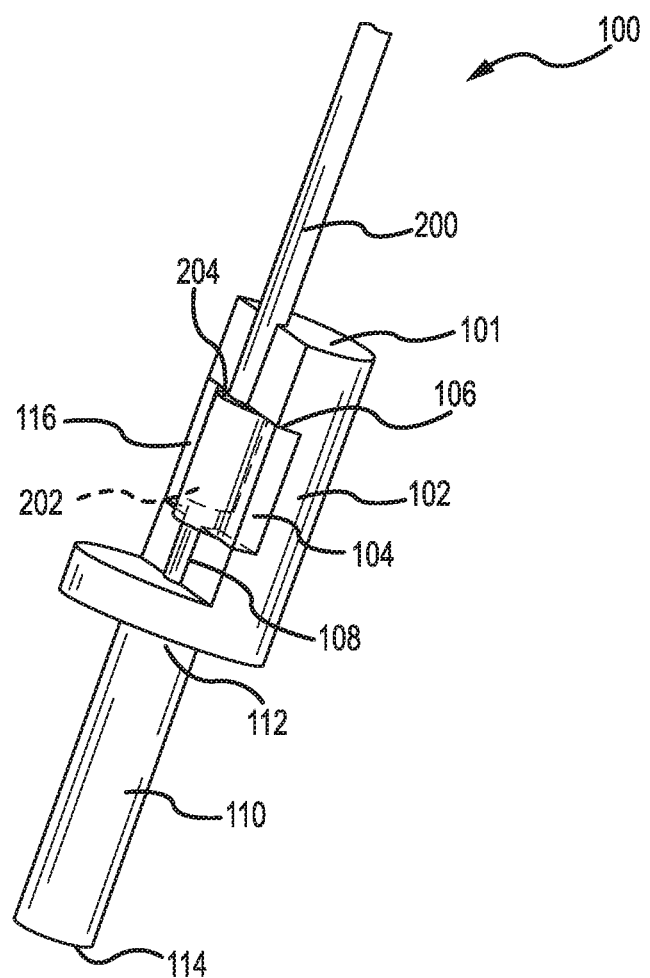
FIG. 3 illustrates a probe seating and locking device, in accordance with various embodiments.

In various embodiments and with reference now to FIGS. 1A, 1B, and 3, tack strap 116 is shown running across relief cut 104 and over sleeve 202. Tack strap 116 is coupled to the main body 102 and the sleeve 202 in order to hold the first index surface 106 proximate the second index surface 204 and prevent the sleeve 202 from lifting from the relief cut 104.

Figure 4:
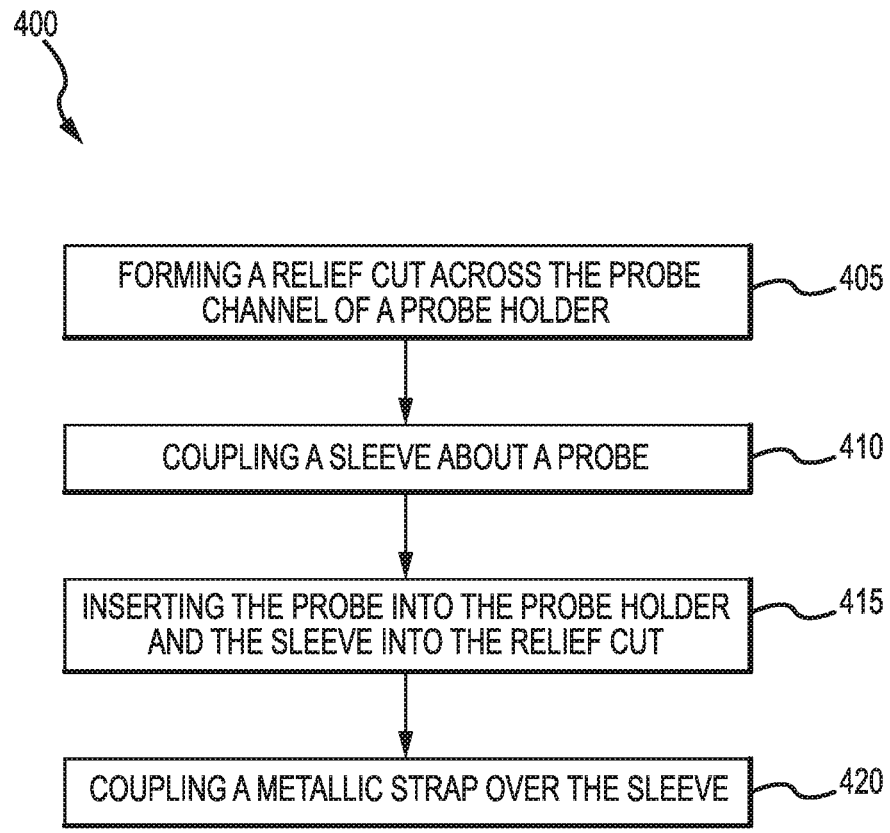
FIG. 4 illustrates a method of seating and locking a probe in a probe holder, in accordance with various embodiments.

A block diagram illustrating a method 400 for seating and locking a probe in a probe holder as depicted in FIG. 4, in accordance with various embodiments. With combined reference to FIGS. 1A, 1B, 2, 3 and 5, forming a relief cut 405 may comprise making a relief cut such as relief cut 104 or relief cut 504 across a probe channel such as probe channel 108 or probe channel 507. Forming a relief cut may be accomplished by any of the techniques commonly known such as end milling with a square end cutter or ball end cutter or a T-end cutter or the like, or by face milling, or by broaching, or by electrical discharge machining. Coupling a sleeve 410 about a probe such as probe 200 may comprise brazing or shrink fitting a sleeve such as sleeve 202 or sleeve 502 concentrically or at least partially concentrically about a probe such as probe 200 or probe 505. Inserting the probe into the probe holder 415 may comprise disposing the sensing end such as sensing end 208 or sensing end 520 of a probe such as probe 200 or probe 506 proximate the sensing aperture such as sensing aperture 302 or sensing aperture 514 of a probe housing such as probe housing 110 or probe housing 508. A probe such as probe 200 may contact seating step such as seating step 304. Second index surface 204 of sleeve 202 may be disposed proximate first index surface 106 of relief cut 104. Coupling a metallic strap 420 over the sleeve such as sleeve 202 or sleeve 502 may comprise welding a tack strap such as tack strap 116 to the main body such as main body 102 at one side of a relief cut such as relief cut 104 and pulling the free end of the tack strap 116 over the sleeve 202 to the opposite side of the relief cut. The tack strap 116 may then be welded to the main body 102 and to the sleeve 202.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

What is claimed is:

1. A probe seating and locking device comprising:
a main body having a transverse relief cut entirely across the main body, a probe channel in communication with the relief cut, and a probe housing extending from the main body, wherein the probe housing has a probe passage in communication with the probe channel, the probe passage having a first end, a second end, and a sensing aperture, wherein the probe housing is coupled to the main body at the first end; and
a sleeve disposed at least partially concentrically about a probe, wherein the sleeve comprises an annular cylinder structure, wherein the probe extends fully through the annulus of the annular cylindrical structure, wherein the probe is disposed in the probe channel and the annular structure is configured to interfere with the relief cut and, in response to the interference, retain the probe in the probe channel.

2. The probe seating and locking device of claim 1, wherein the sleeve is disposed within the relief cut, wherein the probe is configured to be disposed radially outward of rotating turbomachinery.

3. The probe seating and locking device of claim 2, wherein the sleeve is coupled to the probe by at least one of brazing, shrink fitting, or welding.

4. The probe seating and locking device of claim 3, wherein the relief cut has a first index surface and the sleeve has a second index surface.

5. The probe seating and locking device of claim 4, wherein the first index surface and the second index surface are configured to align a sensing end of the probe proximate the sensing aperture.

6. The probe seating and locking device of claim 4, wherein the probe passage further comprises a seating step wherein an interference between the first index surface and the second index surface is configured to hold the probe in contact with the seating step at the second end of the probe housing.

7. The probe seating and locking device of claim 1, wherein the probe housing comprises at least one of steel, stainless steel aluminum, aluminum alloy, titanium, or titanium alloy.

8. A probe seating and locking device comprising:
a main body having a transverse relief cut entirely across the main body, a probe channel in communication with the relief cut, and a probe housing extending from the main body, wherein the probe housing has a probe passage in communication with the probe channel, the probe passage having a first end, a second end, and a sensing aperture, wherein the probe housing is coupled to the main body at the first end, wherein the probe housing is disposed at an angle to the main body; and
a sleeve disposed at least partially concentrically about a probe, wherein the sleeve comprises an annular cylinder structure, wherein the probe extends fully through the annulus of the annular cylindrical structure,
wherein the probe is disposed in the probe channel and the annular structure is configured to interfere with the relief cut and, in response to the interference, retain the probe in the probe channel.

9. The probe seating and locking device of claim 8, wherein the sleeve is disposed within the relief cut, wherein the probe is configured to be disposed radially outward of rotating turbomachinery.

10. The probe seating and locking device of claim 9, wherein the sleeve is coupled to the probe by at least one of brazing, shrink fitting, or welding.

11. The probe seating and locking device of claim 10, wherein the relief cut has a first index surface and the sleeve has a second index surface.

12. The probe seating and locking device of claim 11, wherein the first index surface and the second index surface are configured to align a sensing end of the probe proximate the sensing aperture.

13. The probe seating and locking device of claim 12, wherein the probe housing further comprises a seating step wherein an interference between the first index surface and the second index surface is configured to hold the probe in contact with the seating step at the second end of the probe housing.

14. The probe seating and locking device of claim 8, wherein the probe housing comprises at least one of steel, stainless steel, aluminum, aluminum alloy, titanium, or titanium alloy.

15. The probe seating and locking device of claim 8, wherein the probe housing is coupled to the main body by one of brazing or welding.

16. A method of seating and locking a probe in a probe holder comprising:
forming a transverse relief cut entirely across a main body and across a probe channel of the probe holder having the main body;
coupling a sleeve about a probe having a sensing end, wherein the sleeve comprises an annular cylinder structure, wherein the probe extends fully through the annulus of the annular cylindrical structure; and
inserting the probe into the probe holder and the sleeve into the relief cut such that the sleeve lies in the relief cut with the sensing end of the probe proximate a sensing aperture of a probe passage.

17. The method of claim 16, further comprising;
defining a first index surface of the relief cut, and defining a second index surface of the sleeve.

18. The method of claim 17, further comprising;
calculating a first distance along the relief cut, the probe channel, and the probe passage between the first index surface of the relief cut and the sensing aperture; and
calculating a second distance along the probe between the second index surface of the sleeve and the sensing end of the probe.

19. The method of claim 18, further comprising;
brazing the sleeve to the probe at a point where the first distance and the second distance are equal; and
inserting the sleeve in the relief cut such that the first index surface lies proximate the second index surface.

20. The method of claim 16, further comprising;
coupling a metallic tack strap across the relief cut and over the sleeve; and
welding the metallic tack strap to the main body.

* * * * *